(12) United States Patent
Beheshti-Zavareh et al.

(10) Patent No.: US 9,197,562 B2
(45) Date of Patent: *Nov. 24, 2015

(54) CONGESTION CONTROL IN PACKET DATA NETWORKING

(71) Applicant: Telefonaktiebolaget L M Ericsson (publ), Stockholm (SE)

(72) Inventors: Neda Beheshti-Zavareh, San Jose, CA (US); Ying Zhang, Fremont, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,391

(22) Filed: Mar. 16, 2015

(65) Prior Publication Data

US 2015/0195203 A1    Jul. 9, 2015

Related U.S. Application Data

(63) Continuation of application No. 13/464,182, filed on May 4, 2012, now Pat. No. 9,013,995.

(51) Int. Cl.
*H04L 12/801* (2013.01)
*H04L 12/815* (2013.01)
*H04L 12/891* (2013.01)
*H04L 12/26* (2006.01)

(52) U.S. Cl.
CPC .............. *H04L 47/12* (2013.01); *H04L 43/062* (2013.01); *H04L 47/115* (2013.01); *H04L 47/22* (2013.01); *H04L 47/41* (2013.01); *H04L 43/0882* (2013.01); *Y02B 60/33* (2013.01)

(58) Field of Classification Search
None
See application file for complete search history.

(56) References Cited

U.S. PATENT DOCUMENTS

| 7,130,271 | B1 * | 10/2006 | Sekihata | 370/236 |
| 2005/0108444 | A1 * | 5/2005 | Flauaus et al. | 710/15 |
| 2010/0208587 | A1 * | 8/2010 | Landry et al. | 370/230.1 |
| 2012/0023231 | A1 | 1/2012 | Ueno | |
| 2013/0258847 | A1 | 10/2013 | Zhang et al. | |

OTHER PUBLICATIONS

Csaba, Simon, "Scalable Quality of Service Solutions for IP Networks and Services", Oct. 1, 2011, 137 pages, Budapest, Hungary, downloaded from Kar/2012/Simon_Csaba/ertekezes.pdf on Sep. 17, 2013.
McKeown, N. et al., "Openflow: enabling innovation in campus networks", Apr. 2008, 6 pages, ACM SIGCOMM Computer Communication Review, vol. 38 No. 2, New York, USA.

* cited by examiner

*Primary Examiner* — Vincelas Louis
(74) *Attorney, Agent, or Firm* — Nicholson De Vos Webster & Elliot LLP

(57) ABSTRACT

A network element controls congestion in a link of a packet data network. A congested link is identified and a throttle rate is determined for one or more of the traffic groups traversing the congested link. The central controller determines the throttle rates using a weight of the group and the current traffic rate of the group through the link. The throttle rates are sent to switches to throttle traffic for each affected group.

22 Claims, 6 Drawing Sheets

CONGESTION CONTROL IN PACKET DATA NETWORKING

CROSS-REFERENCE TO RELATED APPLICATIONS

This application is a continuation of application Ser. No. 13/464,182, filed May 4, 2012, which is hereby incorporated by reference.

FIELD OF THE INVENTION

The present disclosure is related to controlling congestion with a central controller in packet data networks and more particularly to controlling congestion through a link using packet traffic groups and weights for each traffic group.

BACKGROUND

TCP (Transmission Control Protocol) has been used as a reliable transport layer protocol for packet data networking for decades. It is particularly seen combined with Internet Protocol for TCP/IP and has been improved continuously over the years.

In the Internet, packet loss can occur because of transmission errors, but occurs more commonly because of congestion. TCP's has a congestion control mechanism that sees end-to-end packet loss and reacts by reducing the number of outstanding unacknowledged data segments allowed in the network.

However, not all Internet applications use TCP and therefore do not follow the same concept of congestion control. Some audio/video streaming applications, for example, use UDP (User Datagram Protocol) not TCP. Streaming is currently used for Internet audio players, IP-telephony, video conferencing and similar types of real-time applications. Since these applications commonly do not integrate TCP-compatible congestion control mechanisms, they treat competing TCP flows differently from how TCP flows treat other flows. Typically upon encountering congestion, all contending TCP-flows reduce their data rates in an attempt to dissolve the congestion, while the non-TCP flows continue to send at their original rate. This can lead to starvation of the TCP traffic, or even to a congestion collapse. The available bandwidth in a network is almost exclusively occupied by packets that are discarded because of congestion before they reach their destination. Congestion control is further limited in TCP and other mechanisms because the operations are performed in a distributed manner and are based on a limited knowledge about the congestion status of the overall network.

SUMMARY

A method is implemented in a network element to control congestion in a link of a packet data network. A congested link is identified and a throttle rate is determined for one or more of the traffic groups traversing the congested link. The central controller determines the throttle rates using a weight of the group and the current traffic rate of the group through the link. The throttle rates are sent to switches to throttle traffic for each affected group.

Users (or applications) may be grouped into traffic groups, traffic groups that are prioritized using weights. Each group's traffic may be treated differently according to the assigned priority weight during times of congestion.

A network with many switches may be controlled by a single centralized controller. This provides a network-wide view of the congestion status in the network. Using this view, more intelligent and efficient congestion control decisions can be made.

In one embodiment, a method is performed in a central controller element coupled to a network of packet data switches with ingress and egress ports with links between an ingress port of one switch and an egress port of another switch. The central controller identifies a congested link of the network, the link having traffic from a plurality of packet traffic groups from an ingress port to an egress port. It determines a throttle rate for a packet traffic group of the congested link based on a weight of the group and a current traffic rate of the group, and it sends the determined throttle rate from the central controller to an ingress switch of the network, the ingress switch having an egress port that is coupled to an ingress port of the link.

In another embodiment, a network element is coupled to a network of packet data switches with ingress and egress ports with links between an ingress port of one switch and an egress port of another switch, the network element operating as a central controller to throttle traffic on the links. The network controller includes a network processor to identify a congested link of the network, the link having traffic from a plurality of packet traffic groups from an ingress port to an egress port, and to determine a throttle rate for a packet traffic group of the congested link based on a weight of the group and a current traffic rate of the group, and a transmit port coupled to the network to send the determined throttle rate from the network element to an ingress switch of the link, the ingress switch having an egress port that is coupled to an ingress port of the.

In another embodiment, a network element is coupled to a network of packet data switches, the network element having an ingress and an egress port to form links with packet data switches of the network between an ingress node of one switch and an egress node of another switch, the network element operating to throttle traffic on the links to which it is connected based on instructions from a central controller. The network element also includes a processor to identify a congested link of the network by comparing a current packet data traffic load on the link to the packet data traffic bandwidth of the link, the load including traffic from a plurality of packet traffic groups, the link having traffic from a plurality of packet traffic groups from an ingress port of the network element, and a transmit port to send a congestion message to a central controller of the network

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it may also be applied to other embodiments whether or not explicitly described.

DETAILED DESCRIPTION

Figure 1:
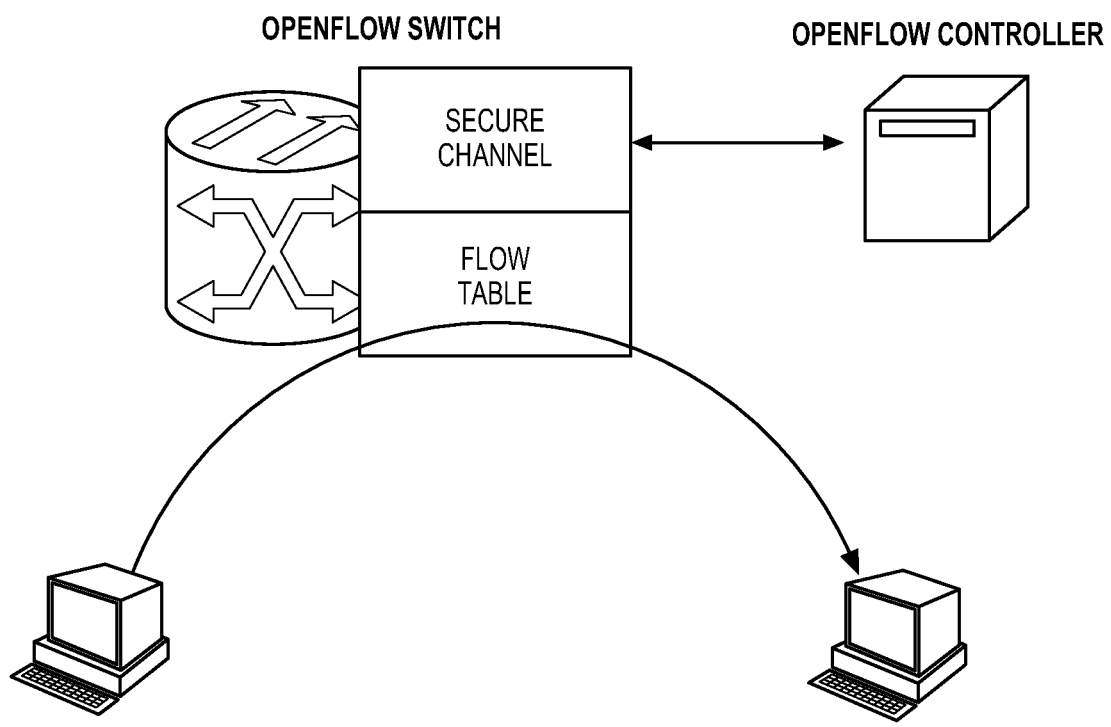
FIG. 1 is a diagram of one embodiment of an example architecture for a simple OpenFlow network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of the figures. However, the operations of the flow diagrams can be performed by embodiments of the invention other than those discussed and the described embodiments can perform operations different than those discussed with reference to the flow diagrams.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

A single access/aggregation network can be made up of multiple distinct split-architecture areas working in tandem with multiple traditional routers. As used herein, a split-architecture area is a section of a split architecture network with separate routing similar to a domain. This can be done to simplify administration over a wide geographical area, for network robustness or for control-plane scalability. Each split architecture area can be administered by a separate controller. Depending on the specific application, controllers of these distinct split-architecture areas need to share and exchange some information for proper administration of the split architecture network.

A split-architecture network design introduces a separation between the control and forwarding components of the network, also referred to as the control plane and the forwarding or data plane. Split architecture networks can be utilized in an access/aggregation domain of a carrier-grade network, a mobile backhaul, cloud computing, and multilayer (L3 & L2 & L1, optical transport network (OTN), wavelength division multiplexing (WDM)) support, all of which are among the building blocks of the network architecture.

Unlike the traditional network architecture, which integrates both forwarding (data) and control planes in the same box, split architecture decouples these two functions and runs the control plane on servers (controllers) that might be in different physical locations from the forwarding elements (switches). The split architecture simplifies the functions and hardware of the forwarding platform and concentrates the networks intelligence and management into a set of controllers that oversee the switches. The tight coupling of forwarding and control planes in the traditional network architecture usually results in a highly complicated control plane and complex network management. This makes creation of new networking devices expensive and creates a high bather to entry for new protocols and technology for potential deployment in these devices. Despite the rapid improvement in line speeds, port densities, and performance, the network control plane mechanisms for managing these features have advanced at a much slower pace.

In a split architecture network, controllers collect information from switches, and compute and distribute the appropriate forwarding decisions to switches. Controllers and switches use a control plane protocol to communicate and exchange information. An example of such a protocol is OpenFlow, which provides an open and standard method for a switch to communicate with a controller. FIG. 1 is a diagram of an overview of the OpenFlow interface between a switch and a controller. The OpenFlow controller communicates with the OpenFlow switch using a secure channel to configure a forwarding table (flow table).

The forwarding table in an OpenFlow switch is populated with entries consisting of: rules defining matches for fields in packet headers; actions to be executed upon detecting a match defined by a rule; and a collection of statistics on the processing of data packets in the data plane. When an incoming data packet matches a particular rule, the associated actions are performed on the data packet. A rule contains key fields from several headers in the protocol stack, for example Ethernet MAC addresses, IP address, IP protocol, TCP/UDP port numbers as well as the incoming port number. A set of data packets having similar characteristics can be managed as a flow. A flow can be defined using any number or combination of the available fields in a data packet. It is also possible to restrict the rules to match on a subset of the available fields by using wildcards for the unwanted fields.

The de-coupling of the control plane and data plane of the split architecture eases the task of modifying the network control logic and provides a programmatic interface upon which developers can build a wide variety of new protocols and management applications. In this model, the data and control planes can evolve and scale independently, while the cost of the data plane elements is reduced.

In some embodiments congestion control and traffic management are provided in split-architecture networks. The approaches described herein may be applied to any network with a centralized controller, such as a GMPLS (Generalized Multiprotocol Label Switching) network. A Mobile backhaul/core network is one example of a network for which the described congestion control mechanism is well-suited. Rather than enforcing guaranteed quality of service for each individual user as is currently done, operators can group users (or applications) into traffic groups, prioritize traffic groups, and treat each group's traffic according to the assigned priority level during times of congestion.

In embodiments of the present invention, a central controller is used. A network with many switches may be controlled by a single centralized controller. In one embodiment, the centralized controller gathers traffic statistics from all the switches and makes decisions on congestion management in real time. The central controller may also receive specific congestion information from all links in the networks. This provides a network-wide view of the congestion status in the network. Using this view, more intelligent and efficient congestion control decisions can be made. However, the central controller may be co-located with a switch or router of the network, or it may be a part of a switch, router or other network element.

The present invention is not limited to congestion control for traffic between a pair of ingress-egress nodes of a single area network. Any set of packets that share a number of packet headers may be categorized to be treated as a traffic group for use with the described congestion control mechanism.

The described embodiments do not require drop statistics from switches. Other statistics may be used instead. As a result, switches that do not support the recording of packet drops can be supported. Instead, all the calculations may be based on packet arrival rates. Aggregate statistics from switches within the network may also be used, where flow aggregation does not allow per-flow statistics.

In some embodiments, congestion is managed by traffic groups. Traffic in the network may be grouped into different traffic groups, each with an assigned weight. A traffic group for purposes of the present description is a set of packets that are treated equally by the congestion control mechanism. The definition of a group may be adapted to suit different applications of congestion control. For instance, a traffic group can be defined as an application (identified e.g. by port number), an end-host (identified e.g. by source IP address), a web server (identified e.g. by destination IP address), an aggregated set of users (belonging e.g. to an ISP), traffic of a specific VLAN, traffic between a specific pair of ingress-egress ports, etc. The defined traffic groupings may also be used for many other purposes, such as routing and operations and management functions.

For purposes of congestion control different traffic groups are assigned different weights. The assigned weights allow different traffic groups to be prioritized, in the sense that larger weights will result in fewer packet drops at times of congestion. The assigned weights are used when the network is congested. When a link is congested, the required throttle rate for each traffic group using that link may be calculated based on the traffic group's weight.

As an example, when a link is congested, the controller may adjust the bandwidth consumed by each group according to the group's weight. This rate adjustment may be done through probabilistic packet dropping (packet throttling) at the ingress switches of a network or area or using other types of packet throttling. Details for an example throttling strategy are described in more detail below.

A weight can be any arbitrary positive number. Different traffic groups are not required to have different weights and there are no constraints on the granularity of the weights or on the number of possible different weights assigned in a network. Each group may have a different weight or some groups may have the same weight. The relative weight of two traffic groups only matters if the two traffic groups both traverse the same link in the network. Otherwise, the two groups will never compete for the same link. In that case, the weight assignment for the two traffic groups may be independent of each other.

Traffic grouping and weight assignment may be performed in any of a variety of different ways depending on the configuration of the network and the traffic on the network. The particular choice of groups and weights may be adapted to suit any particular implementation which provides great flexibility to the network administration.

Since the described congestion control mechanism prioritizes traffic groups using weight assignments, there is no constraint in how many different levels of priority the system can support. More levels of priority may be added without affecting the complexity of computations, signaling, or queuing because no separate queuing for different traffic groups within the network is needed.

In a split architecture, the switch behavior may be abstracted in the context of flows, where each flow corresponds to a set of packets across a link. For each flow (e.g. a set of packets) that needs to be handled and processed by the switch, a rule may be defined to specify a number of header fields that match the packets in the flow or set. Corresponding to each rule, there is a set of actions that will be applied to the incoming packets that match the rule. The rule can also have "don't care" bits. This allows flows to be aggregated.

The switch may also track the number of hits for each rule. In one example, a counter is updated every time there is a match against the rule. Counters in split-architecture switches allow statistics on packet arrivals to be collected. At network ingress switches, these statistics may be collected for each flow. Within the network after the ingress, however, it may not be possible to collect individual statistics for each flow after the flows have been aggregated. Congestion control as described below uses per-traffic group statistics at network ingress switches, and aggregate statistics within the network.

The statistics collected by an individual switch within the network can be solicited or requested from the switch by the central controller. Upon receiving a request from the controller, the switch can send its counter information to the controller. Alternatively, the switch can send its counter statistics to the controller at a pre-configured rate, or when a triggering 'event' happens.

Figure 2:
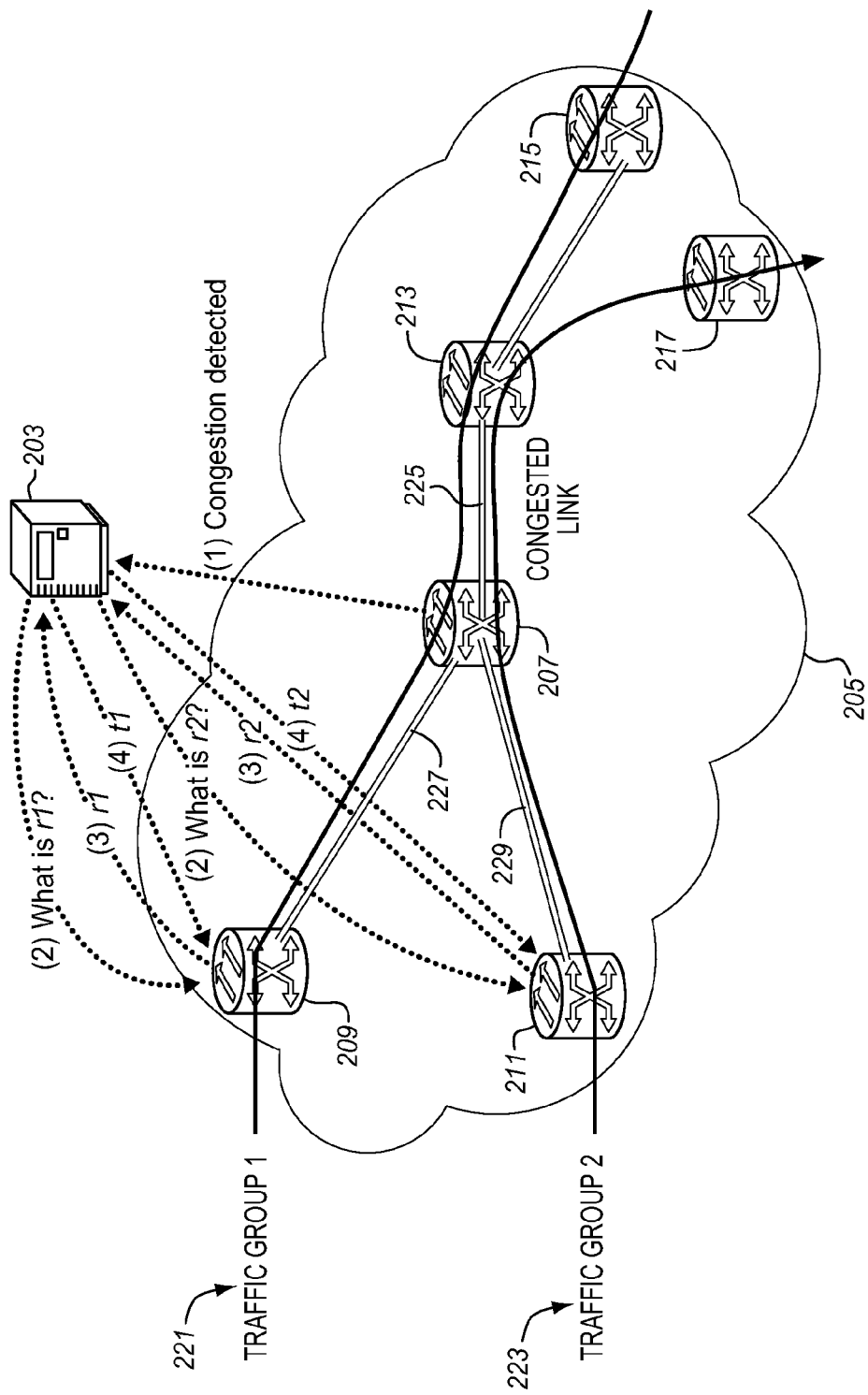
FIG. 2 is diagram of network area with a central controller and a congested link according to an embodiment of the invention.

FIG. 2 is a diagram of computer network using a split-architecture layout, however, the invention is not so limited. A central controller 203 collects statistics from switches in the SA (Split Architecture Area) 205 which are coupled to each other and to other external packets source and sinks (not shown). Traffic flows are passed through the switching based on the packet routing imposed by the central controller, however, any other routing control may be used. In the illustrated example, there are two traffic groups, traffic group 1 221 and traffic group 2 223. These are groups of incoming packets that are to be routed through the SA 205 to an external switch. The ingress switch 209 for traffic group 1 forwards the packets of the group on to a second switch 207. The ingress switch 211 for traffic group 2 forwards its packets also to the same second switch 207. The combined packet flows are then sent to a further switch 213 of the SA and then sorted for forwarding to one of two other egress switches 215, 217. This simple packet flow and simple network of switches is provided as an example, and many other network configuration and routing paths are possible.

In one example, each switch has the capability of monitoring the load on each of its link output ports. This may be done in any of a variety of different ways, for example, by monitoring the occupancy of the corresponding output queue, by monitoring the number of dropped packets, or in another way. The switch can then compare this with a link congestion threshold. If the load crosses the threshold, the switch may send a 'congestion' message to the controller.

FIG. 2 also shows a sequence of messages that may be exchanged between the controller and the switches. The first message (1) is a "congestion detected" message that is sent from one of the switches 207 to the controller 203. The reporting switch that sent the message is in this case coupled to three different links 225, 227, 229. In this case, since the congestion message identifies a link 225 that combines two traffic groups 221, 223 the congestion is a combination of traffic from the two groups.

The controller may refer to collected traffic statistics to determine what, if any, action should be taken, or, as in the illustrated example, the controller sends a traffic rate request (2) to each of the ingress switches 209, 211 that provide packets to the congested link 225. The ingress switches are positioned at the edge of the switches to receive traffic from the two groups in the SA. The controller inquires of the ingress switches about the actual or current rates (r1, r2) of those traffic groups (g1, g2) that have the congested link 225 as part of their paths.

The two ingress switches respond with the requested rates using a rate response message (3). The controller collects this information, applies known weights and bandwidth values, and determines a throttling rate. The controller, after determining the appropriate throttling rates (t1, t2), sends the corresponding rate in a message (4) back to the ingress switches. The ingress switches then apply the calculated throttling rates to the traffic. This stops some of the traffic from entering the network area and reduces the amount of congestion on all downstream network elements.

As an alternative, each switch sends a message with collected traffic statistics to the controller. The message may be sent on a regular, repeating, or periodic basis and at a preconfigured rate. In this way, the controller computes the traffic rate and compares it with the congestion threshold. The controller may instead poll the switches for data based on a schedule that is determined by the controller. The controller may choose to poll more active switches more frequently than switches that have a smaller amount of traffic, or it may use any other criteria to determine when to poll a switch.

When congestion messages are used, the switches monitor the traffic rate for each output queue against a threshold. This allows each switch to independently determine whether it is coupled to a congested link. When statistics are gathered, switches only send their counter statistics (number of hits) to the controller. The controller compares the rates to thresholds to determine whether any links are congested. While the controller must perform more functions, the switches are simpler. On the other hand, signaling overhead is increased when switches send statistics that are not needed by the controller. The two approaches may also be combined so that, for example, the controller collects and stores traffic statistics but also receives alerts from switches about congested links.

As described above, either the switch or the controller determines whether a link is congested. This can be determined in a variety of different ways. In some embodiments it is determined by comparing traffic statistics to thresholds. As an example, congestion may be declared on a link when the load on that link exceeds some fraction of the links total traffic bandwidth. The load can be represented in different ways, for example as the aggregate traffic rate of all of the traffic groups on the link. This can be expressed mathematically as in Eq. 1.

$$\text{Load} = \Sigma r i > \alpha * Cl \quad \text{(Eq. 1)}$$

In Eq. 1, Load is the total traffic on the link. $\Sigma$ ri is the aggregate traffic rate of all groups on the link where ri is the traffic rate for group i. Cl is the bandwidth of link l, and $0 < \alpha \leq 1$ is a configurable congestion parameter determined by the operator. For example, $\alpha = 0.7$ means that a load exceeding 70% of the link bandwidth identifies the link as congested.

In the examples above, the switch or the controller has a table of congestion parameters and allowed bandwidth for each link ($\alpha$, Cl) and collects traffic rates (r) for each group on each link. The traffic rates for each traffic group are summed to determine the load which is then compared to the bandwidth.

Upon receiving a congestion message or upon determining that a link is congested. The switch of the controller calculates a throttle rate for those groups who have traffic on the congested links. The throttle rate may be determined in many different ways. In some embodiments, the traffic rate is a rate at which packets of a group are to be dropped at the ingress of the network.

For a single congested link upon which there are traffic groups, an allowed rate (ai) for traffic group i can be determined by comparing the weight W of the traffic group to the weight of all of the traffic groups that use the link and applying that comparison to factor the allowed link bandwidth.

Such a determination of the allowed rate for a particular group (ai) can be expressed mathematically as Eq. 2.

$$a_i = \alpha * C_l * \frac{W_i}{\Sigma W_i} \quad \text{(Eq. 2)}$$

In Eq. 2, ai is the allowed traffic rate for traffic group i. $\alpha$Cl is the allowed aggregated traffic rate on the link. Wi is the weight of traffic group i, and $\Sigma$Wi is the sum of the weights of all of the traffic groups that share linl l. Accordingly, the allowed rate for each traffic group is proportional to the weight of that group. Note that the summation $\Sigma$Wi is only over traffic groups that share the linl l.

Using the allowed rate ai for traffic group i, the throttle rate ti can be determined by comparing ri, the actual or current rate of the group, to ai, the allowed rate. If the current rate is below the allowed rate, then no throttling is applied. This serves to protect traffic groups that are not overusing the link. Because in Eq. 2, the allowed rate is based on the weight of a traffic group relative to the other traffic groups that use the same link, the weights serve as a way to prioritize traffic groups. Using this principle, quality of service can be controlled based on the weight assigned to a particular traffic group. A traffic group with a high weight will be allowed a higher traffic rate than a traffic group with a lower rate.

On the other hand if the current traffic rate exceeds the allowed traffic rate, then a throttle rate can be applied to the traffic rate. The throttle rate can be determined and expressed in a variety of different ways, depending on the nature and complexity of the switch that applies the throttling. In one example, the throttle rate is simply the ratio of the allowed rate divided by the current rate. Subtracted from unity, this will give a fraction between 0 and 1 by which the rate should be throttled. If the current rate ri is much larger than the allowed rate ai, then the throttle rate will be close to 1 or 100%. This example of determining the throttle rate can be expressed mathematically as in Eq. 3.

$$t_i = \begin{cases} 1 - \frac{a_i}{r_i}, & \text{if } (r_i > a_i) \\ 0, & \text{if } (r_i \leq a_i) \end{cases} \quad \text{(Eq. 3)}$$

In Eq. 3, the drop rate is calculated based on the difference of the actual rate (ri) and the allowed rate (ai). If the actual rate is already less than the allowed rate, then no throttling is required. Otherwise, the throttle rate will be proportional with the amount of rate that exceeds the allowed rate.

In the case of multiple congested links in the network, the throttle rate of a traffic group may be determined as the maximum of all of the throttle rates determined across all of the congested links traversed by the traffic group in the network. In other words, for each congested link, the throttle rate for the traffic group is determined. These throttle rates are compared and the maximum rate is selected.

After a throttle rate is determined for a particular traffic group, the calculated throttling rate is sent to the corresponding ingress switches, i.e., those ingress switches with traffic affected by the congestion. When an ingress switch receives the information on throttling rates, it drops packets of each traffic group according to the group's throttle rate. As shown in the example of FIG. 2, while the congested link 225 is between two interior switches 207, 213 through which two different traffic groups 221, 223 are combined, the throttling rates t1, t2 are sent to the ingress switches 209, 211 at which the traffic groups enter the network.

Figure 3:
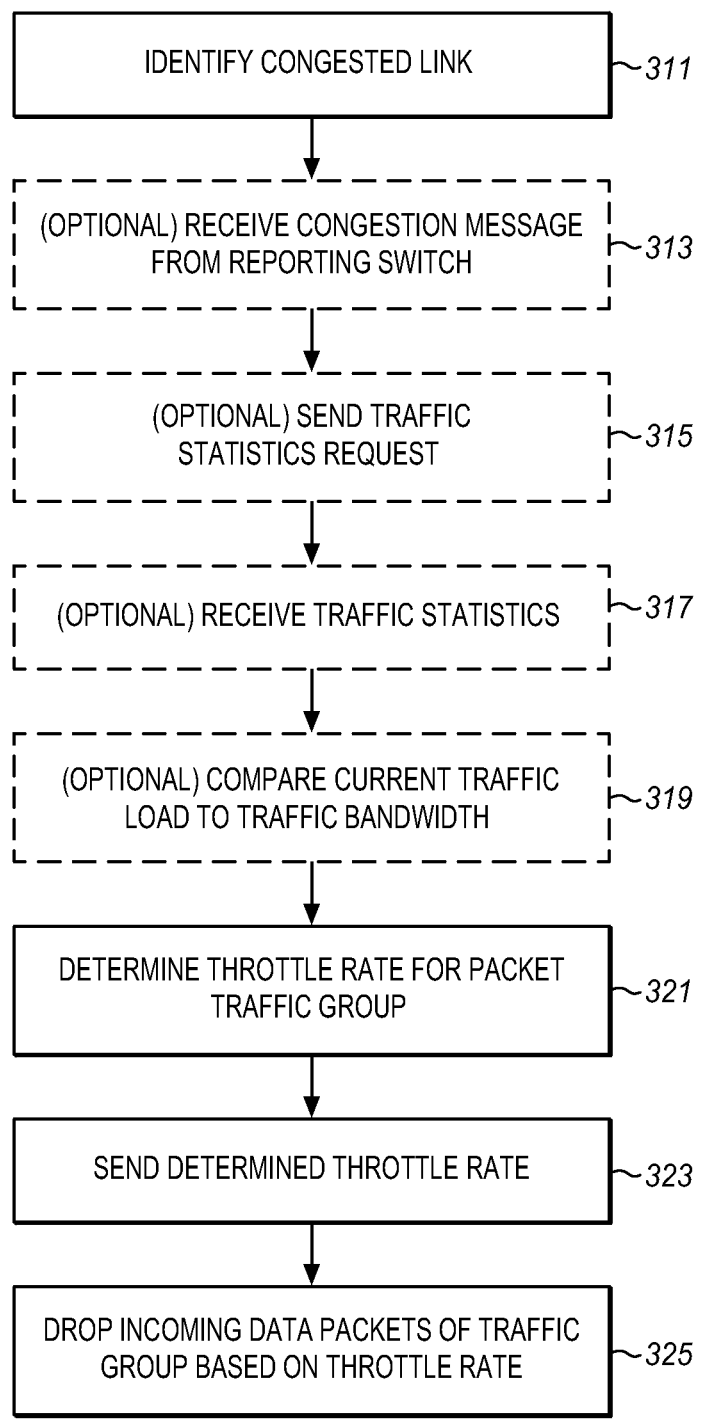
FIG. 3 is a process flow diagram for controlling congestion in a packet data network according to an embodiment of the invention.

FIG. 3 is a process flow diagram for controlling congestion in a packet data network. At 311, a congested link is identified. This may be done in any of a variety of different ways. In one example, the current traffic rate is compared to an allowed bandwidth for a particular link. If the traffic rate exceeds the allowed bandwidth, then the link is determined to be congested. At 313, if the congestion determination is made by a switch, then a congestion message is received by a central controller from a reporting switch. Alternatively, if the congestion determination is made at the controller, then no congestion message from the switch is necessary. If a congestion message is used, then it may implicitly or explicitly identify the link that has been determined to be congested.

At 315, if a congestion message has been received, then the controller sends a traffic statistics request. Since the controller knows the topology of the network or the routing paths of different traffic groups, the controller can send the request to the ingress switches corresponding to the traffic that is congested at the identified link. The controller may also request statistics from other switches including the reporting switch. The corresponding ingress switches then respond to the request by sending the traffic statistics. At 317, the controller receives the sent traffic statistics from the switches. The controller may alternatively, use collected statistics that it has already obtained from previous requests.

At 319, the controller uses the statistics to compare the current traffic load at the congested link to the allowed traffic bandwidth. This not only allows the controller to verify that the link is congested but may also be used to determine the throttle rate. At 321, the controller determines a throttle rate for a packet traffic group. While the congestion message identifies only a particular link, the statistics will identify traffic rates for different traffic groups. The traffic rate for each group may be compared to the bandwidth for each group. This will result in a throttle rate for each group. Some groups may not be throttled in which case the throttle rate is a rate that provides no throttling. According to Eq. 3 that throttle rate is 0. Alternatively, the controller can simply not send a rate for the traffic group that is not throttled. For any one link, there may be only one traffic group, however, there may also be many traffic groups. The controller may determine a different throttle rate for each traffic group based on the weights, the current traffic rate, and the allowed bandwidth.

At 322, the controller sends the determined throttle rate or rates to the appropriate switches. In the examples above, the throttle rates will be sent to the ingress switch for each traffic group. At each switch that receives a throttle rate, at 325, the switch drops incoming data packets of the respective traffic group based on the received throttle rate.

Figure 4:
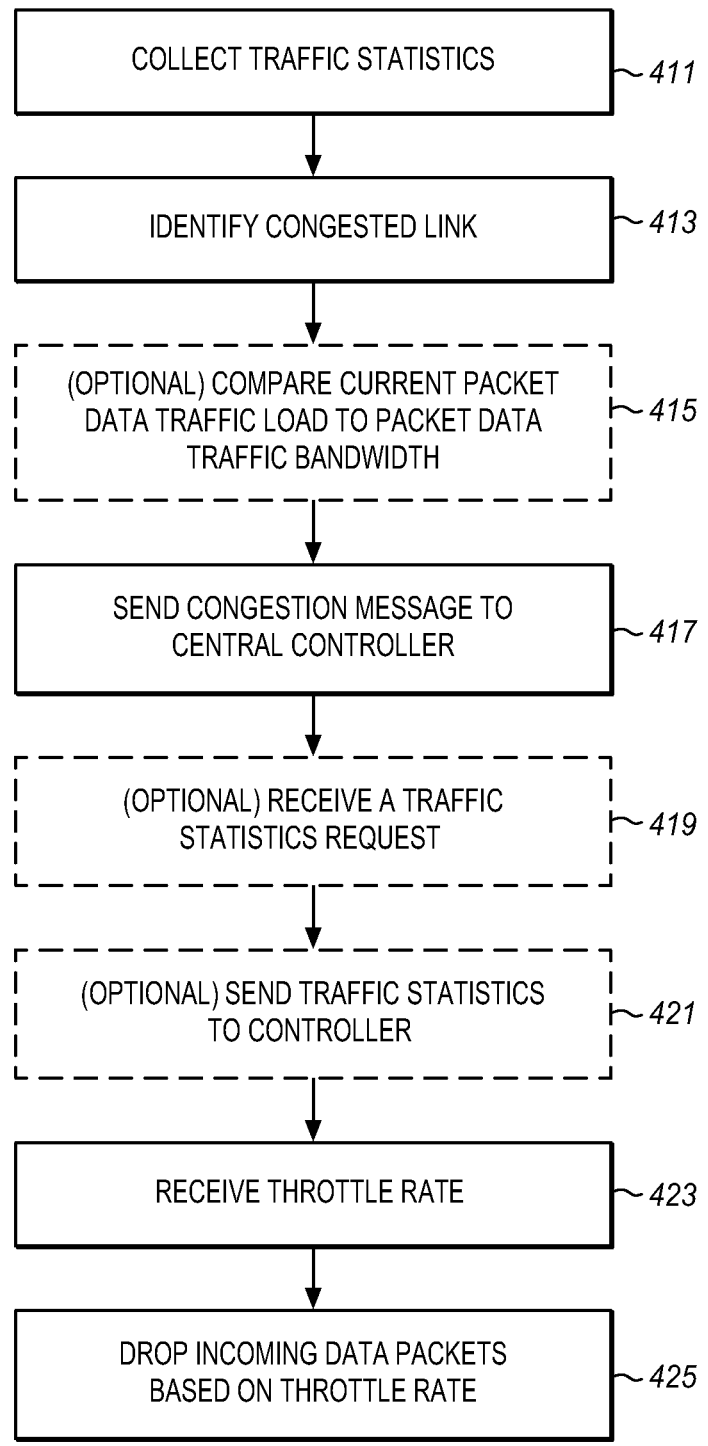
FIG. 4 is a process flow diagram for messaging between a switch and a controller regarding a congested link in a network according to an embodiment of the invention.

FIG. 4 is a process flow diagram for messaging between a switch and a controller regarding a congested link in a network. At 411, traffic statistics are collected. They may be collected by a controller or a switch or both. At 413, using the statistics, a congested link is identified. At 415, the current packet data traffic load is compared to the packet data traffic bandwidth. This information may be used to identify a congested link or for later throttle rate determinations. Like operations 313 to 319, this operation is also optional.

At 417, a congestion message is sent from the switch that detected the congested link to a central controller. The switch becomes the reporting switch for purposes of the transaction. At 419, the reporting switch receives a traffic statistics request from the central controller. In response to the request, the switch, at 421, sends traffic statistics for the congested link to the controller. The sent statistics may be raw statistics or they may include intermediate calculations, such as the comparison of the packet data traffic load to the link bandwidth. The statistics may be independent for each of the traffic rate groups that traverse the congested link. This allows the controller to determine different throttle rates for each group.

At 423, the reporting switch receives a throttle rate from the central controller. As compared to the example of FIG. 2, in this example the reporting switch also performs throttling. This may be because the reporting switch is the ingress switch for the traffic group or it may be because the controller determines that traffic should be managed at the switch that determines the congestion condition. At 425, the switch drops incoming data packets based on the received throttle rate. The throttle rate may be for all traffic or there may be a different throttle rate for each traffic group. In the examples above, the reporting switch will receive the throttle rate for each traffic group for which it serves as the ingress switch. However, in an alternative embodiment, the switch will receive throttle rates for any traffic groups on the link about which it sent a congestion message. Since the switch controls all of the packets that are sent over the congested link, it is able to throttle traffic over the congested link. The central controller may select the switch to receive throttle rates based on a variety of network architecture and management factors.

Figure 5:
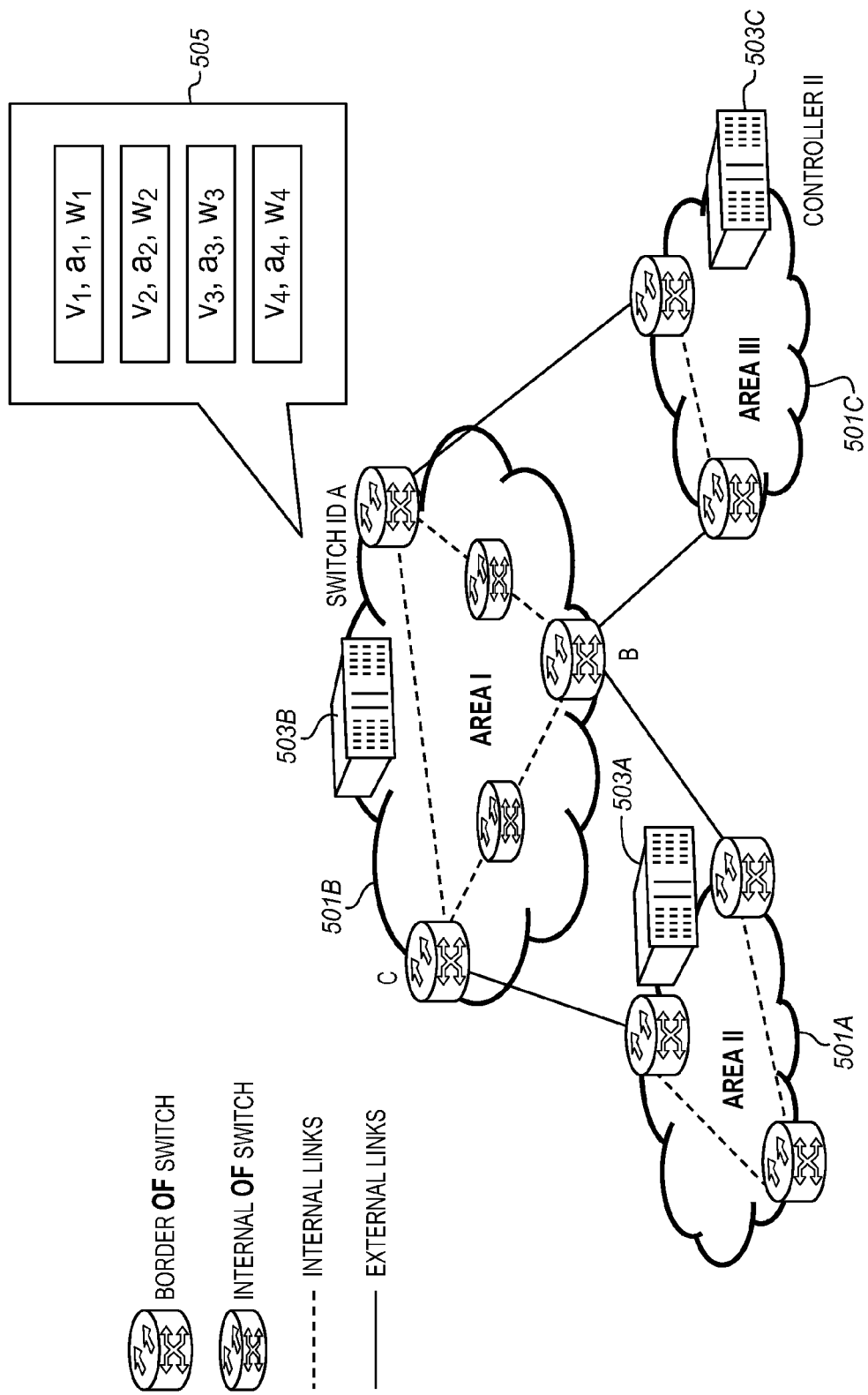
FIG. 5 is a diagram of one example embodiment of a split-architecture network according to an embodiment of the invention.

FIG. 5 is a diagram of one example embodiment of a split-architecture network. The example split-architecture network is divided into separate split-architecture areas (SAs) 501A-C. Each area 501A-C (also labeled as AREA I, AREA II, AREA III) contains a set of switches. All switches in the same area are controlled by a single logical controller 503A-C. In one embodiment, the SAs can be implemented as a primary controller and a set of backup controllers for redundancy purposes. While a single physical controller is shown for each SA there may be multiple physical components to make up a single logical controller for each SA. The network elements in each SA are typically under the control of a single logical controller.

The switches in each SA can be any type of router, switch or similar networking device capable of implementing a data plane of a split architecture network. The switches can include border split-architecture switches and internal split-architecture switches. A border split-architecture switch supports split-architecture functions with an interface connecting to another switch in different SAs. A border split-architecture switch is typically controlled by the controller of a single SA. In other embodiments, the border split-architecture switch can be in multiple SAs and have interfaces controlled by each respective SA controller. An internal split-architecture switch supports split-architecture protocols. It is controlled by the controller in its area. All its neighbors are within the same SA.

The switches are in communication with each other over a set of links. These links can be any type of communication medium including wired or wireless communication mediums and any combination thereof. The links can be categorized as either internal links or external links. Internal link are links between two switches within an SA, these switches could be either border switches or internal SA switches, which belong to the same SA. External links are links between two SA switches belonging to different SAs. In this case, both of the SA switches are border SA switches. In the illustrated example, the border switches for AREA I are labeled A, B, and C. These three switches are also the ingress and egress switches for data traffic that enters or leaves AREA I.

As shown the central controller 503B for SA 1 maintains a table of statistics 505. This table contains rates, r, allocations, a, and weights, w, for each of the traffic groups served by the SA. The table is maintained using reports, responses to requests, and by any other suitable means depending on the particular embodiment. The table is then stored in memory at the controller.

Figure 6:
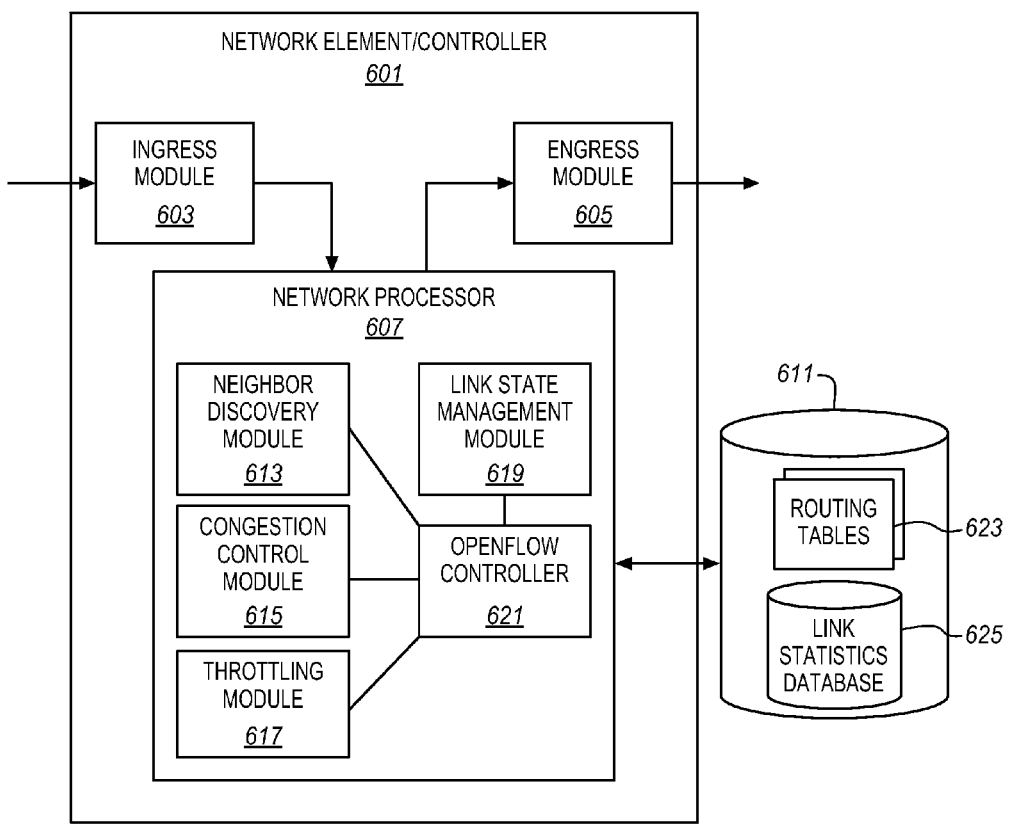
FIG. 6 is a diagram of a diagram of one embodiment of a network element implementing a controller or a switch according to an embodiment of the invention.

FIG. 6 is a diagram of one embodiment of a network element implementing a controller or a switch. In one embodiment, the controller 601 is a router, switch or similar networking device. The controller 601 can include an ingress module or port 603, an egress module or port 605, a network processor 607 and a storage device 611. The ingress module 603 handles incoming data traffic at the physical and link level and provides this data to the network processor for further processing. This ingress module serves as a receive port for data traffic and for command and control information. Any requests, responses or other messages are received at this receive port. Similarly, the egress module 605 handles outgoing data traffic at the physical and link level to transmit it to other devices over a connected network. The egress module serves as a transmit port for data and for command and control information. Any outgoing requests, messages, or responses are sent through this transmit port. These two modules function together to enable communication with other devices over a network. While the network element 601 is shown as having a separate ingress and egress module or port, these two ports may be coupled through a single physical connector.

The network processor 607 is a processing device or a set of processing devices that execute the functions of the network element including each of the functions related to the control plane of the network that govern the data plane of the network. The network processor 607 can execute a set of modules including a neighbor discovery module 613, a congestion control module 615, a throttling module 617, a link state management module 619 and a controller module such as an OpenFlow controller 621.

In addition, the network processor 607 can access data stored within the storage device 611. The data stored in the storage device 611 can include routing tables 623 and a link statistics database 625. In other embodiments, the storage device 611 can include any number of separate local or distributed storage devices and any arrangement of stored data across these devices. The other modules executed by the network processor can also be loaded from or stored on the storage device 611.

The neighbor discovery module 613 can manage the protocols for communicating with other devices in a network using a hello protocol or similar protocol to obtain information about each of the neighboring controllers in a network to enable proper communication between and configuration of the switches of the SA managed by the controller. Any hello protocol or process can be utilized to identify adjacent controllers and switches for the SA.

A congestion control module 615 uses the information gathered by the link state management module 619 to determine whether a link is congested and in the case of a controller to determine a throttle rate to apply to the link. In a switch, the congestion control module may trigger the egress module to send a congestion message to the controller and reply to any requests from the controller. The congestion control module is coupled to the link statistics database 625 to obtain rate and flow statistics for use in determining congestion states for connected links or in the case of the controller to determine throttle rates.

The throttling module 617 in the case of a switch receives any throttle rates from the controller and applies them to incoming packets of the affected traffic group.

A link state management module 619 manages link state information for a network or an area of the network in a link statistics database 625. The link state management module 619 can also generate link state advertisements to be disseminated to adjacent controllers providing information about the connections between the controller and other controllers as well as within the SA of a controller. This information can be packaged as a set of link state advertisements for each border switch pair that is sent to other controllers in the network.

The controller 621 can be any type of split-architecture controller to manage the control plane of the SA. The controller can implement the OpenFlow protocol or a similar protocol for managing a split architecture network. The controller module 621 can communicate with switches in the SA to configure the forwarding of packets on the data plane. The controller 621 also communicates with other controllers to exchange neighbor information, link state advertisements and to provide similar information to peers.

In addition, the network processor 607 can access data stored within the storage device 611. The data stored in the storage device 611 can include routing tables 623 and a link state database 625. In other embodiments, the storage device 611 can include any number of separate local or distributed storage devices and any arrangement of stored data across these devices. The other modules executed by the network process can also be loaded from or stored on the storage device 611.

Thus, a method, system and apparatus for controlling congestion in a packet data network are described. The above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory machine-readable storage medium having code stored therein, which when executed by a processor, cause the processor to perform operations comprising:
    identifying a congested link from a plurality of links of a packet data network, the congested link having traffic from a plurality of packet traffic groups, wherein the plurality of packet traffic groups are prioritized using priority weights and each one of the plurality of packet traffic groups is assigned a priority weight;
    determining a throttle rate for a packet traffic group of the congested link based on the assigned priority weight of the group and a current traffic rate of the group; and
    sending by a central controller the determined throttle rate to an ingress network element of the packet data network, the ingress network element receiving packets of the packet traffic group and wherein the ingress network element is to drop at least one packet from the received packets of the packet traffic group based on the determined throttle rate.

2. The non-transitory machine-readable storage medium of claim 1, wherein identifying the congested link comprises receiving a congestion message from a reporting network element of the packet data network.

3. The non-transitory machine-readable storage medium of claim 2, wherein the operations further comprise sending a traffic statistics request to the ingress network element in response to the congestion message.

4. The non-transitory machine-readable storage medium of claim 3, wherein the operations further comprise receiving traffic statistics from the ingress network element and wherein determining the throttle rate includes determining the throttle rate using the received traffic statistics.

5. The non-transitory machine-readable storage medium of claim 4, wherein receiving the traffic statistics includes receiving values for traffic rates of packet groups on a link related to the received congestion message.

6. The non-transitory machine-readable storage medium of claim 1, wherein the operations further comprise gathering traffic statistics from network elements of the packet data network and wherein identifying the congested link includes determining a current packet data traffic load for the congested link using the gathered traffic statistics and comparing the current packet data traffic load to a traffic bandwidth for the congested link.

7. The non-transitory machine-readable storage medium of claim 6, wherein determining the current packet data traffic load comprises requesting packet data traffic statistics from network elements of the packet data network.

8. The non-transitory machine-readable storage medium of claim 1, wherein determining the throttle rate comprises comparing the current traffic rate of the packet traffic group to a traffic bandwidth for the congested link.

9. The non-transitory machine-readable storage medium of claim 8, wherein the priority weight for the packet traffic group provides a portion of the congested link traffic bandwidth that may be used by the packet traffic group.

10. The non-transitory machine-readable storage medium of claim 1, wherein the throttle rate is proportional to a comparison of the current traffic rate to an allowed traffic rate.

11. The non-transitory machine-readable storage medium of claim 1, wherein each packet traffic group comprises at least one of packets having a common port number, packets having a common source IP address, packets having a common destination IP address, and packets having common users.

12. A method of controlling congestion in a packet data network, the method comprising:
    identifying a congested link from a plurality of links of the packet data network, the congested link having traffic from a plurality of packet traffic groups, wherein the plurality of packet traffic groups are prioritized using priority weights and each one of the plurality of packet traffic groups is assigned a priority weight;
    determining a throttle rate for a packet traffic group of the congested link based on the assigned priority weight of the group and a current traffic rate of the group; and
    sending by a central controller the determined throttle rate to an ingress network element of the packet data network, the ingress network element receiving packets of the packet traffic group and wherein the ingress network element is to drop at least one packet from the packets of the packet traffic group based on the determined throttle rate.

13. The method of claim 12, wherein identifying the congested link comprises receiving a congestion message from a reporting network element of the packet data network.

14. The method of claim 13, further comprising sending a traffic statistics request to the ingress network element in response to the congestion message.

15. The method of claim 14, further comprising receiving traffic statistics from the ingress network element and wherein determining the throttle rate includes determining the throttle rate using the received traffic statistics.

16. The method of claim 15, wherein receiving the traffic statistics includes receiving values for traffic rates of packet groups on a link related to the received congestion message.

17. The method of claim 12, further comprising gathering traffic statistics from network elements of the packet data network and wherein identifying the congested link includes determining a current packet data traffic load for the congested link using the gathered traffic statistics and comparing the current packet data traffic load to a traffic bandwidth for the congested link.

18. The method of claim 17, wherein determining the current packet data traffic load comprises requesting packet data traffic statistics from network elements of the packet data network.

19. The method of claim 12, wherein determining the throttle rate comprises comparing the current traffic rate of the packet traffic group to a traffic bandwidth for the congested link.

20. The method of claim 19, wherein the priority weight for the packet traffic group provides a portion of the congested link traffic bandwidth that may be used by the packet traffic group.

21. The method of claim 12, wherein the throttle rate is proportional to a comparison of the current traffic rate to an allowed traffic rate.

22. The method of claim 12, wherein each packet traffic group comprises at least one of packets having a common port number, packets having a common source IP address, packets having a common destination IP address, and packets having common users.

* * * * *

UNITED STATES PATENT AND TRADEMARK OFFICE
CERTIFICATE OF CORRECTION

| | | |
|---|---|---|
| PATENT NO. | : 9,197,562 B2 | Page 1 of 1 |
| APPLICATION NO. | : 14/659391 | |
| DATED | : November 24, 2015 | |
| INVENTOR(S) | : Beheshti-Zavareh et al. | |

It is certified that error appears in the above-identified patent and that said Letters Patent is hereby corrected as shown below:

On the title page, item 74, under "Attorney, Agent or Firm", in Column 2, Line 2, delete "Elliot" and insert -- Elliott --, therefor.

In the drawings

In Fig. 6, Sheet 6 of 6, for Tag "605", in Line 1, delete "ENGRESS" and insert -- EGRESS --, therefor.

In the specification

In Column 1, Line 8, delete "2012," and insert -- 2012, now Pat. No. 9,013,995, --, therefor.

In Column 4, Line 29, delete "networks" and insert -- network's --, therefor.

In Column 4, Line 34, delete "bather" and insert -- barrier --, therefor.

In Column 8, Line 8, delete "links" and insert -- link's --, therefor.

In Column 8, Line 49, delete "linl l." and insert -- link l. --, therefor.

In Column 8, Line 52, delete "linl 1." and insert -- link l. --, therefor.

Signed and Sealed this
Nineteenth Day of April, 2016

Michelle K. Lee
*Director of the United States Patent and Trademark Office*